US00RE38349E

(19) United States
(12) Reissued Patent
Stonebraker et al.

(10) Patent Number: US RE38,349 E
(45) Date of Reissued Patent: Dec. 16, 2003

(54) DISPLAY SCREEN CHASSIS FRONT MOUNTING

(75) Inventors: Kevin M. Stonebraker, Belleville, MI (US); Joseph P. McInnis, Ann Arbor, MI (US); Ryan P. Gingras, Grass Lake, MI (US)

(73) Assignee: Nematron Corporation, Ann Arbor, MI (US)

(21) Appl. No.: 10/141,376

(22) Filed: May 8, 2002

Related U.S. Patent Documents

Reissue of:
(64) Patent No.: 6,157,423
Issued: Dec. 5, 2000
Appl. No.: 09/045,239
Filed: Mar. 20, 1998

(51) Int. Cl.[7] ..... G02F 1/1333
(52) U.S. Cl. ..... 349/58; 345/905; 248/918; 361/681
(58) Field of Search ..... 361/681, 682; 349/58, 60; 249/917, 918; 345/903, 905

(56) References Cited

U.S. PATENT DOCUMENTS 4,017,129 A * 4/1977 Boldt et al. ..... 312/7.2
4,063,289 A * 12/1977 Veenendaal ..... 348/836
4,593,227 A * 6/1986 Bruce et al. ..... 313/482
4,644,408 A * 2/1987 Coleman ..... 348/836
5,351,176 A * 9/1994 Smith et al. ..... 361/681
5,410,373 A * 4/1995 Sagues et al. ..... 361/682
5,661,630 A * 8/1997 Levins et al. ..... 361/683
5,682,300 A * 10/1997 Sung ..... 361/817
5,699,132 A * 12/1997 Adachi et al. ..... 348/836
5,973,916 A * 10/1999 Han ..... 361/682
5,990,985 A * 11/1999 Kim ..... 361/682

* cited by examiner

*Primary Examiner*—Lisa Lea-Edmonds
(74) *Attorney, Agent, or Firm*—Howard & Howard

(57) ABSTRACT

A wall 16 presents an interior surface 18 extending rearwardly of the front panel. A plurality of tabs 20 extend transversely to the wall 16. The assembly is characterized by reinforcing flanges 26 extending inwardly about the periphery of the wall 16 to reinforce the wall 16. A plurality of threaded fasteners 24 extend through the plate 22 of the chassis to engage the tabs 20 to support the chassis on the front panel. The chassis includes a housing extending rearwardly from the plate 22 and which includes a front 34, a right side 36, a left side 38 and a bottom tray 40.

14 Claims, 1 Drawing Sheet

DISPLAY SCREEN CHASSIS FRONT MOUNTING

Matter enclosed in heavy brackets [ ] appears in the original patent but forms no part of this reissue specification; matter printed in italics indicates the additions made by reissue.

TECHNICAL FIELD

The subject invention relates to an assembly for mounting a display screen supported by a chassis to a front panel which is supported by support structure such as a rack, or the like.

BACKGROUND OF THE INVENTION

Numerous systems are known in the prior art for mounting display screens. Some of the most widely known are those for mounting the cathode ray tubes of televisions sets. Such systems are infrequently dismantled whereas assemblies used in electronic environments are frequently accessed for various reasons. Examples of such prior art assemblies are shown in U.S. Pat. Nos. 4,017,129 to Boldt et al., U.S. Pat. No. 4,063,289 to Veenendaal, U.S. Pat. No. 4,593,227 to Bruce et al., U.S. Pat. No. 4,644,408 to Coleman U.S. Pat. No. 5,351,176 to Smith et al., U.S. Pat. No. 5,661,630 to Levins et al., U.S. Pat. No. 5,682,300 to Sung and U.S. Pat. No. 5,699,132 to Adachi et al.

However, there remains a need for a simple assembly which is easily fabricated and wherein the chassis portion is easily assembled and disassembled to a front panel which remains attached to a support structure, such as a rack.

SUMMARY OF THE INVENTION

A front mounted chassis assembly for a display screen. The assembly includes a front panel for being supported on a support structure and a wall presenting an interior surface extending rearwardly of said front panel to present an open periphery. A plurality of tabs extend transverse to the wall. A chassis for supporting a display screen includes a plate and fasteners extend through the plate to engage the tabs to support the chassis on the front panel, the display screen projecting forwardly of the plate and into the open periphery of the wall to the panel. The assembly is characterized by reinforcing flanges extending inwardly about the periphery of the wall to reinforce the wall.

BRIEF DESCRIPTION OF THE DRAWING

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
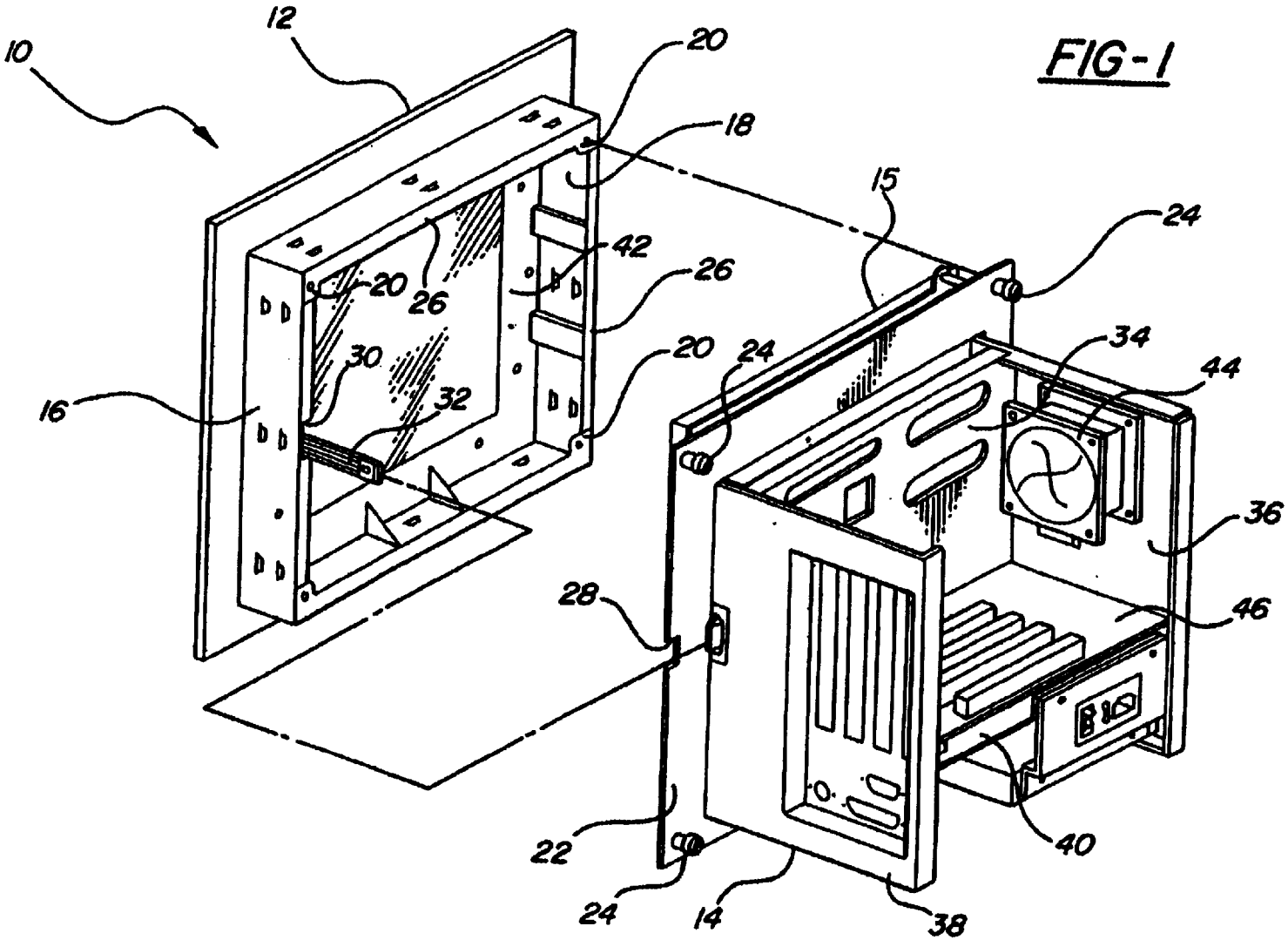
FIG. 1 is an exploded perspective view of the subject invention.

Referring to the FIGURE, wherein like numerals indicate like or corresponding parts throughout the several views, a front mounted chassis assembly for a display screen is generally shown at 10.

The assembly comprises a front panel 12 for being supported on a support structure, such as a rack, and a chassis, generally indicated at 14, for supporting a display screen 15.

A wall 16 presents an interior surface 18 extending rearwardly of the front panel 12. A plurality of tabs 20 extend transversely to the wall 16. More specifically, the wall 16 has four sides to define four corners and one of the tabs 30 is disposed at each of the corners. Each tab extends laterally inward from the sides of the wall 16 but next adjacent the top and bottom sides of the wall 16.

The chassis 14 includes a plate 22. A plurality of threaded fasteners 24 extend through the plate 22 to engage the tabs 20 to support the chassis 14 on the front panel 12.

The assembly is characterized by reinforcing flanges 26 extending transversely to and inwardly about the periphery of the wall 16 to reinforce the wall 16. The plate 22 also has a four sided periphery to present four corners and is of the same general size to fit snugly within the periphery of the wall 16.

In addition, the plate 22 and the flange 26 include a plurality of cut-outs 28 and 30 respectively extending therethrough for allowing an electrical lead 32 to pass therethrough or to accommodate projections on the interior surface 18 of the wall 16.

The wall 16 and the plate 22 are made of metal and each of the tabs 20 includes threads. Each of the fasteners 24 is threaded for threadedly engaging the threads of the tabs 20. Each of the tabs 20 is integral with the flange 26. However, the flange 26 comprises bent over portions from the wall 16, i.e., the top and bottom flange portions are integral with the top and bottom sections of the wall 16 and include the tabs 20 whereas the side flange portions are integral with the side sections of the wall 16.

The chassis 14 includes a housing extending rearwardly from the plate 22 and which includes a front 34, a right side 36, a left side 38 and a bottom tray 40. The bottom tray 40 is positioned vertically part way up the sides 36 and 38 of the housing. The front panel 12 has a larger periphery than the four sided wall 16 and the plate 22 has a larger periphery than the front 34 of the housing so as to extend radially outwardly of the housing. A front wall 42 extends about the periphery of the side walls 16 and defines an opening therein for viewing the display screen, which is supported by the plate 22 and extends forwardly of the plate 22 for engaging the panel 12. The panel 12 is opaque for viewing the display screen 15.

A cooling fan 44 is supported by the housing and at least one circuit board 46 is supported on the bottom tray 40 of the housing.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may practiced otherwise than as specifically described.

What is claimed is:

1. A front mounted chassis assembly for a display screen (15) comprising:

a front panel (12) for being supported on a support structure, a wall (16) presenting an interior surface (18) extending rearwardly of said front panel (12) to present an open periphery, tabs (20) extending transverse to said wall (16), a chassis (14) for supporting a display screen (15), said chassis including a plate (22), said display screen (15) projecting forwardly of said plate (22), fasteners (24) extending through said plate (22) to engage said tabs (20) to support said chassis (14) on said front panel (12) with said display screen (15) projecting into said open periphery of said wall (16) to said panel (12), said assembly characterized by reinforcing flanges (26) extending transversely to and inwardly about the periphery of said wall (16) to reinforce said wall (16).

2. An assembly as set forth in claim 1 wherein said wall (16) and said plate (22) are made of metal.

3. An assembly as set forth in claim 1 wherein said wall (16) has four sides to define four corners, one of said tabs (20) being disposed at each of said corners.

4. An assembly as set forth in claim 3 wherein each of said tabs (20) is integral with said flange (26).

5. An assembly as set forth in claim 4 wherein said plate (22) has a four sided periphery to present four corners and said flange (26) engages said plate (22).

6. An assembly as set forth in claim 5 wherein said plate (22) and said flange (26) include cut-outs (28) and (30) respectively extending therethrough.

7. An assembly as set forth in claim 5 wherein each of said tabs (20) includes threads and each of said fasteners (24) is threaded for threadedly engaging said threads of said tabs (20).

8. An assembly as set forth in claim 5 wherein said chassis (14) includes a housing (34, 36, 38 and 40) extending rearwardly from said plate (22).

9. An assembly as set forth in claim 8 wherein said front panel (12) has a larger periphery than said four sided wall (16).

10. An assembly as set forth in claim 8 wherein said plate (22) has a larger periphery than said housing (34, 36, 38 and 40) so as to extend radially outwardly of said housing (34, 36, 38 and 40).

11. An assembly as set forth in claim 8 including a fan (44) supported by said housing (34, 36, 38 and 40).

12. An assembly as set forth in claim 11 wherein said panel (12) is opaque for viewing said display screen (15).

13. An assembly as set forth in claim 12 including a front wall (42) extending about the periphery of said side walls (16) and defining an opening therein for viewing said display screen (15).

14. An assembly as set forth in claim 13 including at least one circuit board (46) supported on said housing.

* * * * *